United States Patent
Itoh et al.

(10) Patent No.: US 11,939,747 B2
(45) Date of Patent: Mar. 26, 2024

(54) DISPLAY DEVICE, SHOVEL, INFORMATION PROCESSING APPARATUS

(71) Applicant: SUMITOMO HEAVY INDUSTRIES, LTD., Tokyo (JP)

(72) Inventors: Takumi Itoh, Kanagawa (JP); Masaru Onodera, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 242 days.

(21) Appl. No.: 17/445,869

(22) Filed: Aug. 25, 2021

(65) Prior Publication Data

US 2021/0381203 A1  Dec. 9, 2021

Related U.S. Application Data

(63) Continuation of application No. PCT/JP2020/008152, filed on Feb. 27, 2020.

(30) Foreign Application Priority Data

Feb. 28, 2019  (JP) .................. 2019-036482

(51) Int. Cl.
*E02F 9/26* (2006.01)
*B60K 35/00* (2006.01)
(Continued)

(52) U.S. Cl.
CPC .............. *E02F 9/261* (2013.01); *B60K 35/00* (2013.01); *H04N 7/181* (2013.01); *B60K 2370/152* (2019.05); *B60K 2370/1529* (2019.05); *B60K 2370/176* (2019.05); *B60K 2370/21* (2019.05); *E02F 3/32* (2013.01); *E02F 9/16* (2013.01); *E02F 9/205* (2013.01); *E02F 9/2235* (2013.01);
(Continued)

(58) Field of Classification Search
CPC ..... E02F 9/26; E02F 9/261; E02F 9/16; E02F 9/205; H04N 7/183; H04N 7/18; H04N 7/181; B60K 35/00
USPC ............................................ 348/61, 118, 120
See application file for complete search history.

(56) References Cited

U.S. PATENT DOCUMENTS 9,616,748 B2    4/2017 Tsubone et al.
10,687,026 B2 *  6/2020 Izumikawa ............... E02F 9/26
(Continued)

FOREIGN PATENT DOCUMENTS

EP    1596013    11/2005
EP    3415694    12/2018
(Continued)

OTHER PUBLICATIONS

International Search Report for PCT/JP2020/008152 dated May 19, 2020.

*Primary Examiner* — Daquan Zhao
(74) *Attorney, Agent, or Firm* — IPUSA, PLLC

(57) ABSTRACT

A display device displays information image related to an excavation work, in an ambient environment image in a view of a work area or an attachment viewed from a shovel, or in a field of view of an operator viewing the work area or the attachment from the shovel. The shovel may include the display device. A management device may include a display apparatus, a communication device which communicates with the shovel, and a remote control device operated by a user to remotely control the shovel via the communication device.

13 Claims, 5 Drawing Sheets

(51) Int. Cl.
*E02F 9/16* (2006.01)
*H04N 7/18* (2006.01)
*E02F 3/32* (2006.01)
*E02F 9/20* (2006.01)
*E02F 9/22* (2006.01)

(52) U.S. Cl.
CPC ........... *E02F 9/2285* (2013.01); *E02F 9/2292* (2013.01); *E02F 9/2296* (2013.01)

(56) References Cited

U.S. PATENT DOCUMENTS

| | | | |
|---|---|---|---|
| 10,927,527 | B2 | 2/2021 | Machida et al. |
| 11,414,841 | B2* | 8/2022 | Moriki ............... E02F 3/43 |
| 2002/0045986 | A1 | 4/2002 | Tamaru |
| 2013/0158784 | A1 | 6/2013 | Fukano et al. |
| 2015/0376868 | A1* | 12/2015 | Jackson ............... E02F 9/26 |
| | | | 701/50 |
| 2016/0024758 | A1 | 1/2016 | Ishimoto et al. |
| 2018/0080198 | A1 | 3/2018 | Machida et al. |
| 2018/0338087 | A1* | 11/2018 | Oblak ............... G06F 3/04883 |
| 2019/0017248 | A1 | 1/2019 | Okada et al. |
| 2019/0308502 | A1 | 10/2019 | Yoneyama |
| 2019/0330825 | A1 | 10/2019 | Tanimoto et al. |

FOREIGN PATENT DOCUMENTS

| | | |
|---|---|---|
| JP | 2002-121775 | 4/2002 |
| JP | 2002-332941 | 11/2002 |
| JP | 2014-129676 | 7/2014 |
| JP | 2016-194237 | 11/2016 |
| JP | 2018-035645 | 3/2018 |
| WO | 2015/029110 | 3/2015 |
| WO | 2016/047806 | 3/2016 |
| WO | 2016/174977 | 11/2016 |
| WO | 2017/026469 | 2/2017 |
| WO | 2017/170555 | 10/2017 |
| WO | 2018/131241 | 7/2018 |

* cited by examiner

DISPLAY DEVICE, SHOVEL, INFORMATION PROCESSING APPARATUS

CROSS REFERENCE TO RELATED APPLICATIONS

This application is a continuation application of International Application No. PCT/JP2020/008152 filed on Feb. 27, 2020 and designated the U.S., which is based upon and claims priority to Japanese Patent Application No. 2019-036482, filed on Feb. 28, 2019, the entire contents of each of which are hereby incorporated by reference.

BACKGROUND

1. Technical Field

The present disclosure relates to display devices or the like.

2. Description of the Related Art

For example, there is a known technique which displays an information image for assisting work using a shovel on a display device inside a cabin.

However, it may be difficult for an operator to intuitively perceive the information solely from the information image displayed on the display device.

SUMMARY

It is desirable to provide a technique which enables the operator to more intuitively perceive the information when displaying the information image for assisting the work using the shovel.

According to one aspect of the embodiments of the present disclosure, a display device is configured to display an information image related to an excavation work, in an ambient environment image in a view of a work area viewed from a shovel having a plurality of imaging devices mounted on a slewing upper structure, or in a field of view of a user.

According to another aspect of the embodiments of the present disclosure, a shovel has a cabin, and the display device described above inside the cabin.

According to still another aspect of the embodiments of the present disclosure, an information processing apparatus has the display device described above, a communication device configured to communicate with the shovel, and an operating device operated by an operator and configured to remotely control the shovel via the communication device.

Other objects and further features of the present invention will be apparent from the following detailed description when read in conjunction with the accompanying drawings.

DETAILED DESCRIPTION

Hereinafter, embodiments will be described with reference to the drawings.

[Overview of Shovel]

First, an outline of a shovel 100 according to this embodiment will be described, with reference to FIG. 1.

Figure 1:
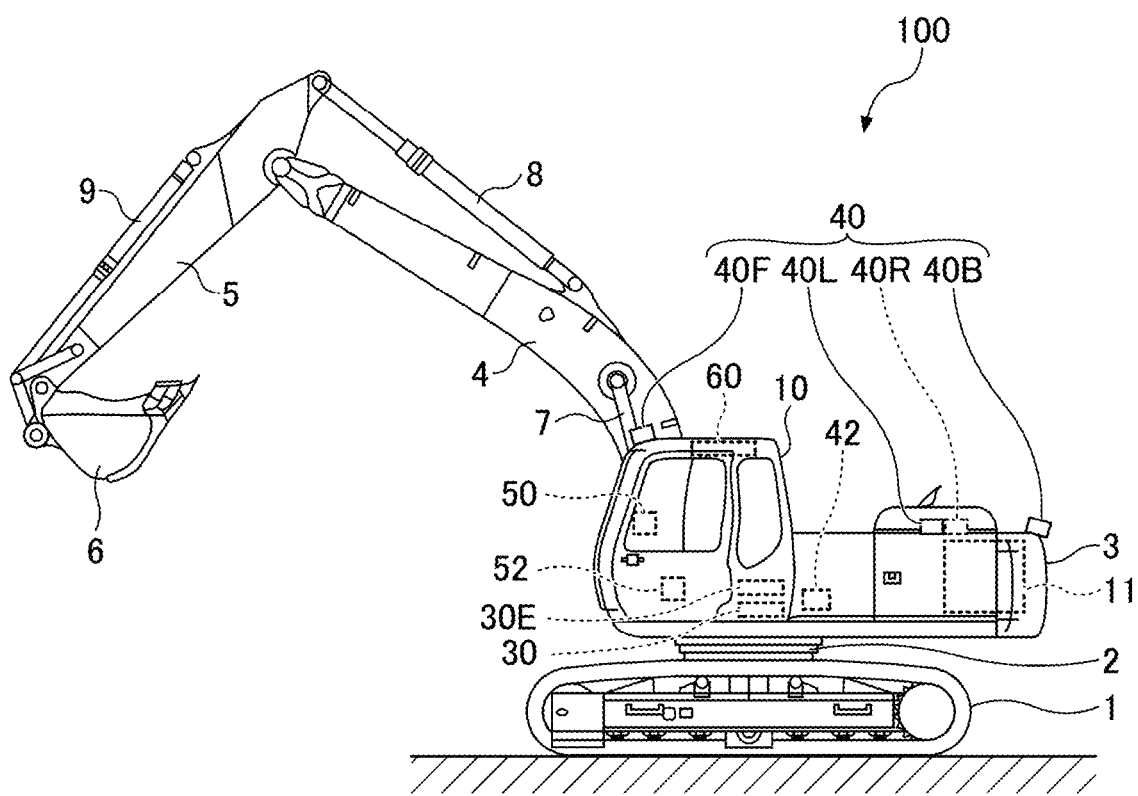
FIG. 1 is a side view illustrating an example of a shovel according to one embodiment.

FIG. 1 is a side view illustrating an example of a shovel 100 according to this embodiment.

The shovel 100 according to this embodiment includes an undercarriage 1, a slewing upper structure 3 which is rotatably mounted on the undercarriage 1 via a swivel mechanism 2, a boom 4, an arm 5, and a bucket 6 which form attachments, and a cabin 10 to be boarded by an operator. Hereinafter, a front side of the shovel 100 corresponds to an extending direction of the attachment with respect to the slewing upper structure 3, in a plan view of the shovel 100 viewed along a swivel axis of the slewing upper structure 3 from immediately above the shovel 100 (hereinafter simply referred to as a "plan view"). A left direction and a right direction of the shovel 100 correspond to a left direction and a right direction viewed from the operator inside the cabin 10, respectively.

The undercarriage 1 includes a pair of left and right crawlers, for example, and the respective crawlers are hydraulically driven by crawler hydraulic motors 1L and 1R (refer to FIG. 2A and FIG. 2B), to cause the shovel 100 to crawl.

Figure 2A:
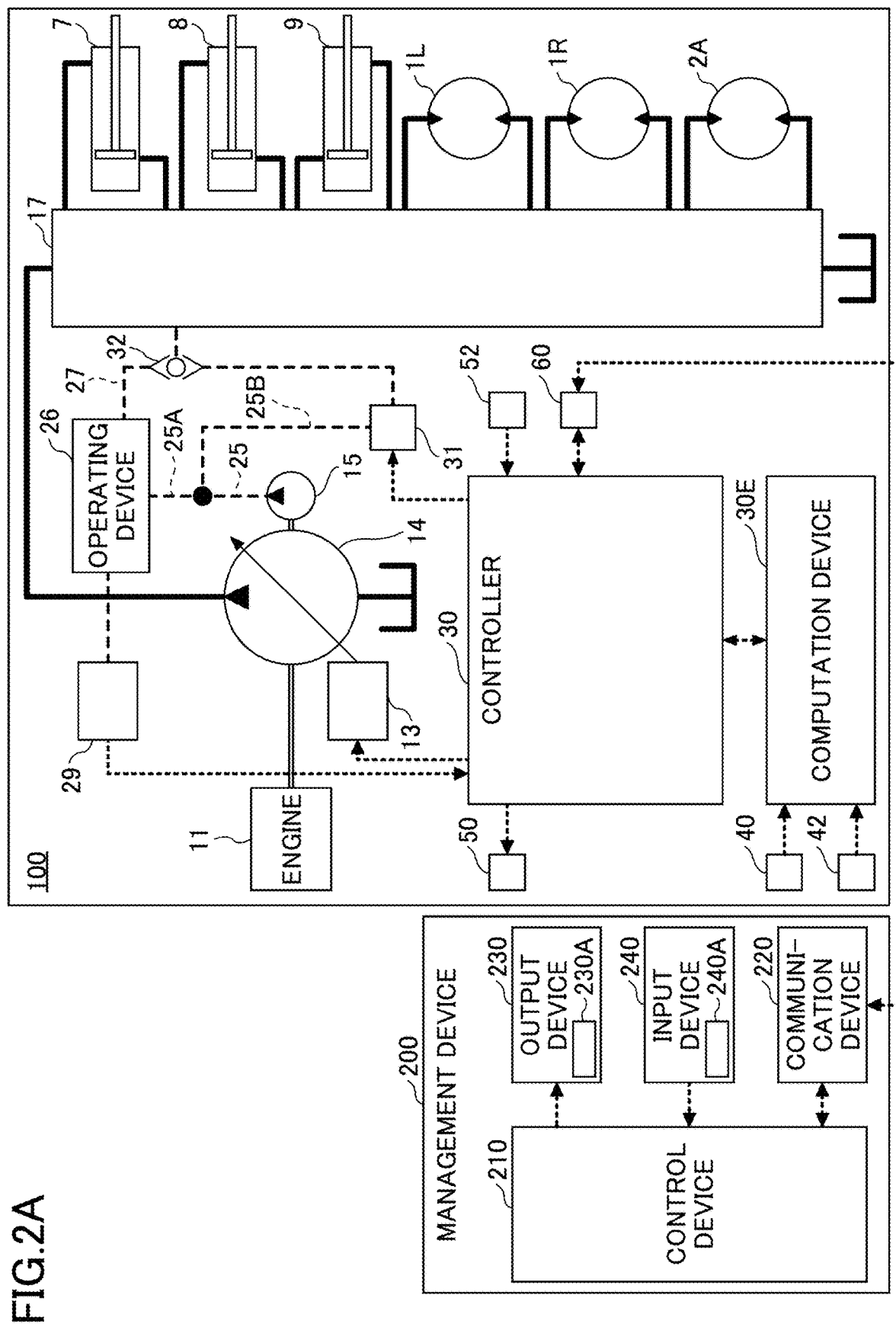
FIG. 2A is a block diagram illustrating an example of a configuration of the shovel according to one embodiment.
Figure 2B:
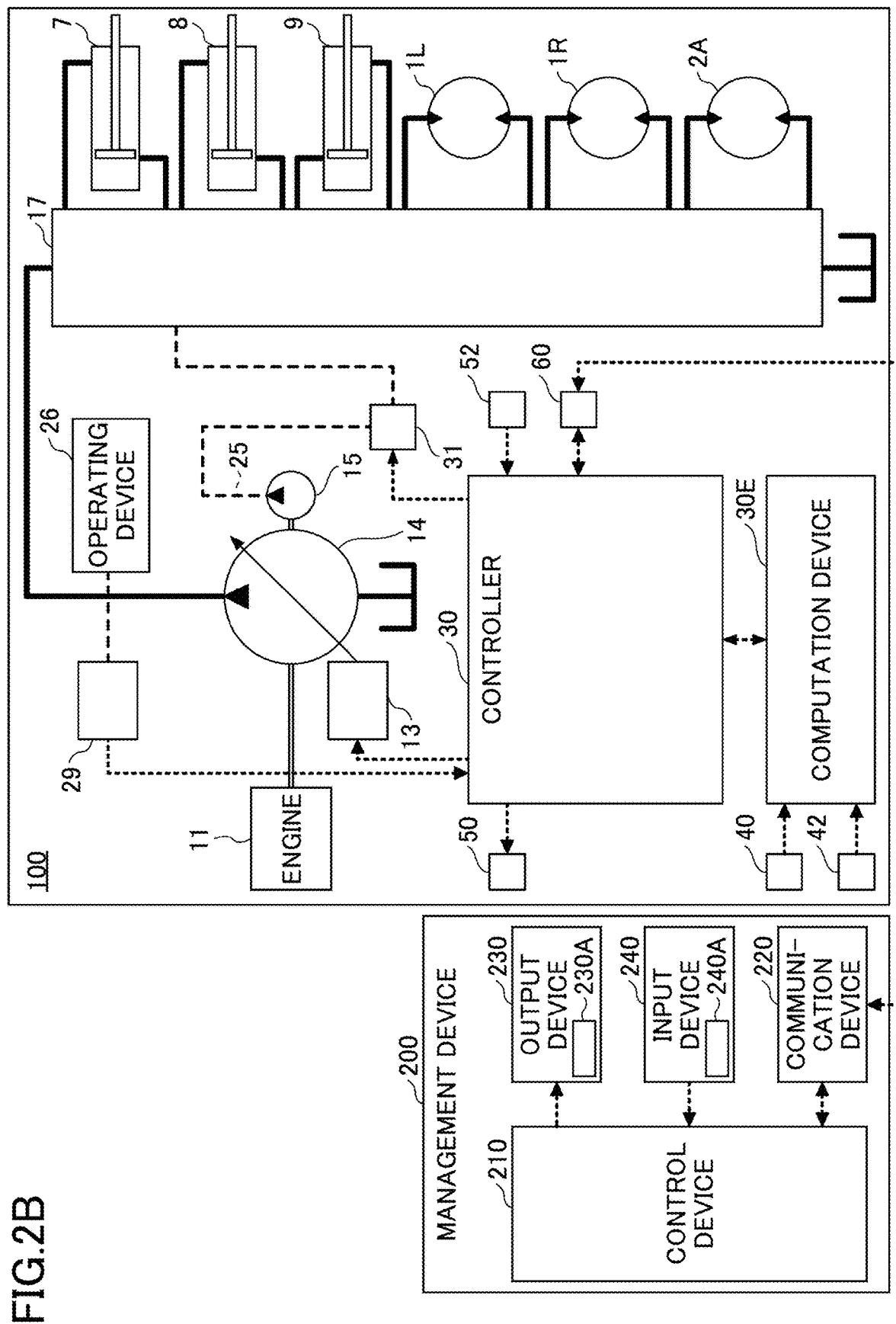
FIG. 2B is a block diagram illustrating another example of the configuration of the shovel according to one embodiment.

The slewing upper structure 3 slews with respect to the undercarriage 1, when the swivel mechanism 2 is hydraulically driven by a swivel hydraulic motor 2A (refer to FIG. 2A and FIG. 2B).

The boom 4 is pivotally mounted at a front center of the slewing upper structure 3 and is able to pitch, the arm 5 is pivotally mounted at a tip end of the boom 4 and is able to swing up and down, and the bucket 6 is pivotally mounted at a tip end of the arm 5 and is able to swing up and down.

The boom 4, the arm 5, and the bucket 6 are respectively hydraulically driven by a boom cylinder 7, an arm cylinder 8, and a bucket cylinder 9 which are provided as hydraulic actuators.

The cabin 10 is a craneman's house (operator cab) that is boarded by the operator, and is mounted at a front left of the slewing upper structure 3, for example.

[Configuration of Shovel]

Next, a specific configuration of the shovel 100 will be described, with reference to FIG. 2 (FIG. 2A and FIG. 2B), in addition to FIG. 1.

FIG. 2A and FIG. 2B are block diagrams illustrating one example and another example of the configuration of the shovel 100 according to this embodiment, respectively.

In the drawings, a mechanical power line is indicated by a double line, a high-pressure hydraulic line is indicated by a solid line, a pilot line is indicated by a dashed line, and an electric drive and control line is indicated by a dotted line.

<Hydraulic Drive System>

A hydraulic drive system of the shovel 100 according to this embodiment includes hydraulic actuators which hydraulically drive the respective driven elements, such as the undercarriage 1, the slewing upper structure 3, the boom 4, the arm 5, and the bucket 6, as described above. As described above, the hydraulic actuators include the crawler hydraulic motors 1L and 1R, the swivel hydraulic motor 2A, the boom cylinder 7, the arm cylinder 8, and the bucket cylinder 9. The hydraulic drive system of the shovel 100 according to this embodiment includes an engine 11, a regulator 13, a main pump 14, and a control valve 17.

The engine 11 is the main power source of the hydraulic drive system, and is a diesel engine which uses diesel oil as fuel, for example. The engine 11 is mounted at a rear of the slewing upper structure 3, for example, and rotates at a preset target speed under direct or indirect control of a controller 30 which will be described later, to drive the main pump 14 and the pilot pump 15.

The regulator 13 controls (adjusts) a discharge amount of the main pump 14 under the control of the controller 30. For example, the regulator 13 adjusts an angle ("tilt angle") of a swash plate of the main pump 14 according to a control command from controller 30.

The main pump 14 is mounted at the rear of the slewing upper structure 3, for example, similar to the engine 11, and supplies a hydraulic oil to the control valve 17 via the high-pressure hydraulic line. The main pump 14 is driven by the engine 11 as described above. The main pump 14 is a variable displacement hydraulic pump, for example, and as described above, a length of a piston stroke is adjusted by adjusting the tilt angle of the swash plate by the regulator 13 under the control of the controller 30, thereby controlling a discharge flow rate (discharge pressure).

The control valve 17 is a hydraulic control device, which is mounted at a center of the slewing upper structure 3, for example, and controls the hydraulic actuators according to an operation content made by the operator with respect to an operating device 26, or according to a control command (hereinafter referred to as an "automatic control command") corresponding to an automatic operation of the shovel 100 output from the controller 30. As described above, the control valve 17 is connected to the main pump 14 via the high-pressure hydraulic line, and selectively supplies the hydraulic oil supplied from the main pump 14 to the hydraulic actuator (the crawler hydraulic motors 1L and 1R, the swivel hydraulic motor 2A, the boom cylinder 7, the arm cylinder 8, the bucket cylinder 9, or the like) according to an operation state the operating device 26, or according to the automatic control command output from the controller 30. More particularly, the control valve 17 includes a plurality of control valves (also referred to as directional control valves) configured to control the flow rate and the flow direction of the hydraulic oil supplied from the main pump 14 to each of the hydraulic actuators.

<Operating System>

An operating system for the hydraulic drive system of the shovel 100 according to this embodiment includes a pilot pump 15, and the operating device 26. In addition, as illustrated in FIG. 2A, the operating system for the hydraulic drive system of the shovel 100 includes a shuttle valve 32 if the operating device 26 is a hydraulic pilot type.

The pilot pump 15 is mounted at the rear of the slewing upper structure 3, for example, similar to the engine 11, and supplies a pilot pressure to various hydraulic devices via a pilot line 25. The pilot pump 15 is a fixed displacement hydraulic pump, for example, and is driven by the engine 11 as described above.

The operating device 26 is provided near an operator's seat inside the cabin 10, and is an operation input means, to be operated by the operator, for operating various driven elements (the undercarriage 1, the slewing upper structure 3, the boom 4, the arm 5, the bucket 6, or the like). In other words, the operating device 26 is an operation input means, to be operated by the operator, for operating the hydraulic actuators (that is, the crawler hydraulic motors 1L and 1R, the swivel hydraulic motor 2A, the boom cylinder 7, the arm cylinder 8, and the bucket cylinder 9, or the like) which drive the respective driven elements. The operating device 26 includes a lever device, for example, configured to operate each of the boom 4 (boom cylinder 7), the arm 5 (arm cylinder 8), the bucket 6 (bucket cylinder 9), and the slewing upper structure 3 (swivel hydraulic motor 2A). In addition, the operating device 26 includes a pedal device or a lever device, for example, configured to operate each of the left and right crawlers (the crawler hydraulic motors 1L and 1R) of the undercarriage 1.

For example, as illustrated in FIG. 2A, the operating device 26 is a hydraulic pilot type. More particularly, the operating device 26 utilizes the hydraulic oil supplied from the pilot pump 15 via the pilot line 25, and a pilot line 25A which branches from the pilot line 25, to output a pilot pressure according to the operation content to a pilot line 27 on a secondary side thereof. The pilot line 27 is connected to the control valve 17 via the shuttle valve 32. Hence, the pilot pressures according to the operation content of the operating device 26 related to the various driven elements (hydraulic actuators) may be input to the control valve 17 via the shuttle valve 32. For this reason, the control valve 17 can drive each of the hydraulic actuators according to the operation content made by the operator or the like with respect to the operating device 26.

As illustrated in FIG. 2B, for example, the operating device 26 is an electric type. More particularly, the operating device 26 outputs electrical signals according to the operation content, and the electrical signals are input to the controller 30. The controller 30 outputs, to the proportional valve 31, a control command (hereinafter referred to as an "operation control command" so as to be distinguishable from the automatic control command) according to the content of the electrical signal, that is, the operation content with respect to the operating device 26. Accordingly, a pilot pressure according to the operation content with respect to the operating device 26 is input from the proportional valve 31 to the control valve 17, and the control valve 17 can drive each of the hydraulic actuators according to the operation content made by the operator or the like with respect to the operating device 26.

If a built-in control valve (directional control valve) of the control valve 17 is a solenoid type, the electrical signal output from the operating device 26 may be input directly to the control valve 17, that is, to a electromagnetic solenoid type control valve.

As illustrated in FIG. 2A, the shuttle valve 32 has two inlet ports and one outlet port, and causes the outlet port to output the hydraulic oil having the higher pilot pressure between the pilot pressures input to the two inlet ports. The shuttle valve 32 is provided with respect to each of the driven elements (the left and right crawlers, the slewing upper structure 3, the boom 4, the arm 5, the bucket 6, or the like) which are operating targets of the operating device 26. One of the two inlet ports of the shuttle valve 32 is connected to operating device 26 (specifically, the lever device or the pedal device described above included in the operating device 26), and the other of the two inlet ports is connected to proportional valve 31. The outlet port of the shuttle valve 32 is connected, via the pilot line, to a pilot port of a corresponding control valve of the control valve 17 (specifically, the control valve corresponding to the hydraulic actuator which is the operating target of the lever device or the pedal device described above connected to one of the inlet ports of the shuttle valve 32). For this reason, each of these shuttle valves 32 can apply the higher one of the pilot pressure generated by the operating device 26 and the pilot pressure generated by the proportional valve 31, to the pilot port of the corresponding control valve. In other words, the controller 30, which will be described later, causes the proportional valve 31 to output a pilot pressure higher than the pilot pressure on the secondary side output from the operating device 26, so that it is possible to control the corresponding control valve regardless of the operation made by the operator with respect to the operating device 26. Accordingly, the controller 30 can automatically control the operation of the driven elements (the undercarriage 1, the slewing upper structure 3, and the attachments), regardless of the operation state of the operator with respect to the operating device 26.

<Control System>

A control system of the shovel 100 according to this embodiment includes the controller 30, a computation device 30E, the proportional valve 31, an ambient environment information acquisition device 40, a boarding machine information acquisition device 42, a display device 50, an input device 52, and a communication device 60. In addition, as illustrated in FIG. 2A, the control system of the shovel 100 according to this embodiment includes an operation pressure sensor 29 if the operating device 26 is a hydraulic pilot type.

The controller 30 performs various controls with respect to the shovel 100. Functions of the controller 30 may be implemented in arbitrary hardware or a combination of hardware and software. For example, the controller 30 is configured by a microcomputer including a Central Processing Unit (CPU), a memory device such as a Random Access Memory (RAM) or the like, a non-volatile auxiliary storage device such as a Read Only Memory (ROM) or the like, an interface device, or the like. The controller 30 provides the various functions by executing one or more programs installed in the auxiliary storage device by the CPU.

The controller 30 provides a machine guidance function, which guides (shows) a manual operation of the shovel 100 by the operator via the operating device 26, based on a computation result of the computation device 30E, for example. More particularly, the controller 30 may generate work information generated by the computation device 30E, such as a distance between a target construction surface of a construction target and the tip end of the attachment (specifically, a work portion, such as a toe, a back surface, or the like of the bucket 6), a depth (that is, the depth to be excavated) from a reference surface of the target construction surface of the construction target, or the like, and present the work information to the operator via the display device 50 or the like which will be described later.

In addition, the controller 30 automatically supports the operation of the operator with respect to the operating device 26, based on the computation result of the computation device 30E, or provides the machine control function which automatically performs the work regardless of the operation of the operator with respect to the operating device 26, for example. More particularly, the controller 30 controls the proportional valve 31 (specifically, outputs the automatic control command to the proportional valve 31), based on a drive command for the hydraulic actuator generated by the computation device 30E, to automatically operate the hydraulic actuator. Hence, the controller 30 can automatically operate at least some of the undercarriage 1, the slewing upper structure 3, the boom 4, the arm 5, the bucket 6, or the like of the shovel 100 (boarding machine), based on data related to the target construction surface, thereby automatically completing the target construction surface, for example.

Moreover, the controller 30 provides a function (hereinafter referred to as a "visual field superimposed display function") for superimposing an information image (for example, work information related to the machine guidance function described above, or the like) related to various work (for example, excavation work, rolling work, leveling work, or the like) of the shovel 100 on a field of view (for example, a visual range) of an ambient environment (for example, in front) of the shovel 100 (boarding machine) viewed from the operator inside the cabin 10, and displaying the superimposed image using the display device 50, based on the computation result of the computation device 30E. Hence, the operator can check the information image which is displayed in a superimposed manner in the field of view, in a state where the operator is sitting in the operator's seat and viewing the ambient environment of the shovel 100. For this reason, the operator can perceive the contents of the information image, together with the ambient environment in the field of view in front of the eye. In other words, the operator can intuitively understand the contents of the information image. Details of the visual field superimposed display function will be described later (refer to FIG. 3 and FIG. 4).

Some of the functions of the controller 30 may be provided by another controller (control device). In other words, the functions of the controller 30 may be distributively provided by a plurality of controllers. For example, the controller which provides the machine guidance function and the machine control function, and the controller which provides the visual field superimposed display function, may be separate controllers.

The computation device 30E performs computation processes related to various functions of the controller 30 (for example, the machine guidance function, the machine control function, the visual field superimposed display function, or the like described above), under the control of the controller 30. The computation device 30E may be implemented in arbitrary hardware or a combination of hardware and software, or the like. For example, the computation device 30E includes a Graphical Processing Unit (GPU), an Application Specific Integrated Circuit (ASIC), a Field-Programmable Gate Array (FPGA), or the like, and executes high-speed computation processes.

The computation device 30E, recognizes the ambient environment of the shovel 100 (boarding machine) (for example, recognizes an object in the ambient environment of the boarding machine, and the distance from the object), based on output information of the ambient environment information acquisition device 40, for example. In addition, the computation device 30E recognizes the position and the attitude of the boarding machine (for example, the attitude of the attachment, the attitude of the slewing upper structure 3, or the like), based on output information of the boarding machine information acquisition device 42. The computation device 30E also generates work information related to the machine guidance function, computes and generates the drive command of the hydraulic actuator related to the machine control function, or the like, based on the recognized ambient environment of the shovel 100 and the various states of the shovel 100.

The computation device 30E can recognize the position and the attitude state of the boarding machine (for example, an inclined state and a slewing state) of the slewing upper structure 3, based on a change in the position of the object in the ambient environment of the shovel 100 (boarding machine) recognized based on the output information of the ambient environment information acquisition device 40. In addition, the computation device 30E may recognize the attitude state of the attachment, based on the output information of the ambient environment information acquisition device 40, if the attachment of the shovel 100 and the position of the attachment can be recognized from the output information of the ambient environment information acquisition device 40. For this reason, the boarding machine information acquisition device 42 may be omitted, if adaptable to other conditions (for example, recognition accuracy or the like).

Further, the computation device 30E generates the information image to be displayed on the display device 50, based on the operation state of the operating device 26, the output information of the ambient environment information acquisition device 40, and the information input via the input device 52 and the communication device 60, or the like, for example.

The proportional valve 31 is provided with respect to each driven element (the left and right crawlers, the slewing upper structure 3, the boom 4, the arm 5, and the bucket 6) of the operating target of the operating device 26. The proportional valve 31 is provided in the pilot line 25 (in the example of FIG. 2A, a pilot line 25B branching from the pilot line 25) between the pilot pump 15 and the control valve 17, and is configured to vary a passage area (that is, a cross sectional area through which the hydraulic oil can flow) thereof so that the passage area is variable by the proportional valve 31. Hence, the proportional valve 31 can output a predetermined pilot pressure to the secondary side, utilizing the hydraulic oil of the pilot pump 15 supplied through the pilot line 25 (pilot line 25B). For this reason, the proportional valve 31 can apply the predetermined pilot pressure according to the control command from the controller 30, to the control valve 17 via the shuttle valve 32 as illustrated in FIG. 2A, or directly to the control valve 17 as illustrated in FIG. 2B. In other words, the controller 30 can output the operation control command according to the electrical signal from the electric operating device 26, to the proportional valve 31, and cause the pilot pressure according to the operation content of the operating device 26 to be supplied from the proportional valve 31 to the control valve 17, thereby providing the operation of the shovel 100 based on the operation made by the operator. Further, even if the operating device 26 is not operated by the operator, the controller 30 can output the automatic control command to the proportional valve 31, and cause the predetermined pilot pressure to be supplied from the proportional valve 31 to the control valve 17, thereby providing automation (machine control function) of the shovel 100.

The ambient environment information acquisition device 40 outputs information (specifically, detection information related to the object in the ambient environment of the shovel 100 and the position of the object) related to a state of a three-dimensional space in the ambient environment of the shovel 100. The ambient environment information acquisition device 40 may include an ultrasonic sensor, an extremely high frequency radar, a monocular camera, a stereo camera, a depth camera, a Light Detection and Ranging (LIDAR), a distance image sensor, an infrared sensor, or the like, for example. In this embodiment, the ambient environment information acquisition device 40 includes a front sensor 40F mounted at the front on an upper surface of the cabin 10, a rear sensor 40B mounted at the rear on an upper surface of the slewing upper structure 3, a left sensor 40L mounted at the left on the upper surface of the slewing upper structure 3, and a right sensor 40R mounted at the right on the upper surface of the slewing upper structure 3. In addition, an upper sensor, configured to output information related to the state of the three-dimensional space above the slewing upper structure 3 (for example, detection information related to the object located above the slewing upper structure 3), may be mounted on the shovel 100. Some or all of the rear sensor 40B, the left sensor 40L, the right sensor 40R, and the upper sensor may be omitted, depending on the performance required for automatic operation of the shovel 100. The output information of the ambient environment information acquisition device 40 is input to the computation device 30E.

The boarding machine information acquisition device 42 acquires the information related to the various states (for example, states such as the position, orientation, attitude, or the like of the shovel 100) of the shovel 100 (boarding machine). For example, the boarding machine information acquisition device 42 may include a positioning device (for example, a Global Navigation Satellite System (GNSS) module or the like) configured to acquire the information related to the position of the boarding machine. Further, the boarding machine information acquisition device 42 may include an attitude sensor configured to acquire information related to an attitude state (for example, an attitude angle about a rotation axis) of each of the attachments, namely, the boom 4, the arm 5, and the bucket 6, and an attitude sensor configured to detect an attitude state (for example, an inclination angle and a slew angle) of the slewing upper structure 3. In this case, the attitude sensors may include a rotary encoder, an acceleration sensor, an angular acceleration sensor, a 6-axis sensor, an Inertial Measurement Unit (IMU), or the like, for example. In addition, the attitude sensors for the attachments may include a cylinder sensor configured to detect a cylinder position of the boom cylinder 7, the arm cylinder 8, the bucket cylinder 9, or the like. The output information of the boarding machine information acquisition device 42 is input to the computation device 30E.

The display device 50 directly displays the information image in the field of view of the operator (an example of the user) who is viewing the work area in the ambient environment from the cabin 10. More particularly, the display device 50 may directly display the information image in the field of view of the operator who is viewing the work area in the ambient environment from the cabin 10, by applying an Augmented Reality (AU) technique under the control of the controller 30 and the computation device 30E.

The display device 50 is a Head-Up Display (HUD), for example. In this case, the head-up display projects the information image onto a front windshield of the cabin 10 or to a combiner attached on an inner side the front windshield. In addition, the head-up display may project the information image onto a left side glass of the cabin 10 or to a combiner attached to the side glass. As a result, the information image projected from the head-up display is superimposed on and displayed in the field of view to the front or the left side of the operator when viewed from the cabin 10.

Moreover, the display device 50 may be a portable wearable display terminal, such as a transmission type Head Mounted Display (HMD), smart glasses (Smartglasses), or the like, for example. In this case, the wearable display terminal projects the information image onto a transmission type projection surface. Hence, the operator can observe the information image projected onto the projection surface, that is, in the field of view of the operator, while observing the state of the ambient environment of the shovel 100 (boarding machine). In other words, the information image projected onto the projection surface of the wearable display terminal is displayed in a superimposed manner in the field of view in front or to left side of the operator viewing the work area in the ambient environment work area from the cabin 10.

The display device 50 may display the image (an example of the image of the ambient environment) corresponding to the field of view of the ambient environment of the shovel 100 (boarding machine) viewed from the operator, under the control of the controller 30 and the computation device 30E, and then display the information image in a superimposed manner on the displayed image. For example, a captured image corresponding to the field of view of the ambient environment viewed from the shovel 100 (boarding machine), such as the image captured by the front sensor 40F or the left sensor 40L used as a camera, or the image captured by a camera mounted on the head mounted display, may be projected onto a non-transmission type projection surface of a non-transmission type head mounted display, and then the information image may be displayed in a superimposed manner on the displayed image.

Hereinafter, a description will be given for a case where the display device 50 is the head-up display.

The input device 52 is provided inside the cabin 10, and is configured to receive an input from the operator. The input device 52 is provided at a position within a range reachable by a hand of the operator seated inside the cabin 10, for example, and includes an operation input device configured to receive various operation inputs from the operator. The operation input device includes hardware operation input means, such as a touchscreen panel, a touch pad, a button switch, a lever, a toggle, a knob switch provided on the operating device 26, or the like, for example. Moreover, the operation input device may include software operation input means, such as a virtual operating target (for example, an operation icon) displayed on a projection surface of the display device 50, various operation screens displayed on other display devices, or the like, inside the cabin 10, and operable by the hardware operation input means. Further, the input device 52 may include a speech input device or a gesture input device configured to receive an operator's speech input or gesture input. The speech input device may include a microphone configured to acquire speech data of the operator inside the cabin 10, for example. The gesture input device may include a sensor (for example, a camera) capable of detecting the operator's gesture, for example. A signal corresponding to the content of the input with respect to the input device 52 is input to the controller 30.

The communication device 60 is connected to a predetermined communication network which may include a mobile communication network having a base station at a terminal end, a satellite communication network using a communication satellite, the Internet network, or the like, for example, and communicates with an external device (for example, a management device 200) external to the shovel 100. The communication device 60 may be a mobile communication module which is in conformance with a predetermined mobile communication standard, such as the 3rd Generation (3G), the 4th Generation (4G), the Long Term Evolution (LTE), the 5th Generation (5G), or the like, for example.

As illustrated in FIG. 2A, the operation pressure sensor 29 detects the pilot pressure on the secondary side (pilot line 27) of the operating device 26, that is, the pilot pressure corresponding to the operation state of the respective driven elements (hydraulic actuators) in the operating device 26. A pilot pressure detection signal, output from the operation pressure sensor 29, and corresponding to the operation state of the undercarriage 1, the slewing upper structure 3, the boom 4, the arm 5, the bucket 6, or the like in the operating device 26, is input to the controller 30. Hence, the controller 30 can ascertain the operation content of the operating device 26.

<Other Configurations>

As described above, the configuration associated with the shovel 100 includes the management device 200 (an example of an information processing apparatus). The management device 200 is configured to make two-way communication with the shovel 100, for example, and may assist a remote control of the shovel 100.

The management device 200 may be a cloud server within a management center provided outside a work site of the shovel 100, for example. In addition, the management device 200 may be an edge server provided in a temporary office in the work site of the shovel 100, or at a location (for example, a base station, a station building, or the like) relatively close to the work site, for example. Moreover, the management device 200 may be a fixed terminal provided in the temporary office or the like at the work site of the shovel 100, for example. The fixed terminal may be a desktop computer terminal, for example. Further, the management device 200 may be a portable terminal which can be carried by a manager, a supervisor, a worker, or the like at the work site of the shovel 100, for example. The portable terminal may be a smartphone, a tablet terminal, a laptop computer terminal, or the like, for example.

As illustrated in FIG. 2A and FIG. 2B, the management device 200 includes a control device 210, a communication device 220, an output device 230, and an input device 240.

The control device 210 performs a control related to the management device 200. Functions of the control device 210 may be implemented in arbitrary hardware or a combination of hardware and software. For example, the control device 210 is configured by a computer including a CPU, a memory device such as a RAM or the like, an auxiliary storage device such as a ROM or the like, an interface device, or the like.

The communication device 220 communicates with an external device, such as the shovel 100, via a predetermined communication network.

The output device 230 outputs information to a user of the management device 200 (hereinafter referred to as a "management device user") under the control of the control device 210.

The output device 230 may include a display device configured to visually output (notify) information to the management device user, for example. The display device may be a liquid crystal display or an organic Electro-Luminescence (EL) display, for example. The same may be applied to a remote control display device 230A which will be described later. In addition, the output device 230 may include an audio output device which notifies audible information to the management device user, for example. The audio output device may be a speaker, for example. In addition, the output device 230 may include the remote control display device 230A configured to display an information image for use by the management device user to remotely control the shovel 100.

The remote control display device 230A (an example of the display device) may display an image (hereinafter referred to as an "ambient environment image") of the ambient environment of the work area viewed from the shovel 100, under the control of the control device 210, for example. More particularly, the ambient environment image may include a captured image of the front sensor 40F or the left sensor 40L used as an imaging device (camera), for example, and further, a captured image of the right sensor 40R or the rear sensor 40B used as the imaging device (camera). The control device 210 may display the ambient environment image on the remote control display device, based on the data of the captured image received from the shovel 100. Hence, the management device user can perform the remote control of the shovel 100 while checking the ambient environment image displayed on the remote control display device 230A. The remote control display device 230A may be a fixed display device, or a portable wearable display terminal, such as a head mounted display, smart glasses, or the like, similar to the display device 50 of the shovel 100.

The input device 240 receives the input from the management device user. The signal indicating the content of the input received by the input device 240 is input to the control device 210.

The input device 240 may include an operation input device configured to receive the operation input from the management device user, for example. The operation input device may include a keyboard, a mouse, a touchscreen panel mounted in a display area of the output device 230 (display device), or the like, for example. In addition, the input device 240 may include a speech input device or a gesture input device respectively configured to receive the speech input or the gesture input from the management device user. Moreover, the input device 240 may include a remote control device 240A configured to remotely control the shovel 100.

The remote control device 240A (an example of the operating device) may be configured to include a lever device, similar to the operating device 26 of the shovel 100. The control device 210 transmits a signal (hereinafter referred to as a "remote control signal"), indicating a remote control content input from the remote control device 240A, to the shovel 100 via the communication device 220. Hence, the control device 210 can assist the remote control of the shovel 100. The controller 30 of the shovel 100 may output a control command (hereinafter referred to as a "remote control command") according to the remote control content specified by the remote control signal received from the communication device 60, to the proportional valve 31. Hence, the controller 30 can provide the operation of the shovel 100 according to the remote control content input by the management device user.

[Details of Visual Field Superimposed Display Function]

Next, the visual field superimposed display function of the shovel 100 will be described in detail, with reference to FIG. 3 and FIG. 4.

<First Example of Visual Field Superimposed Display Function>

Figure 3:
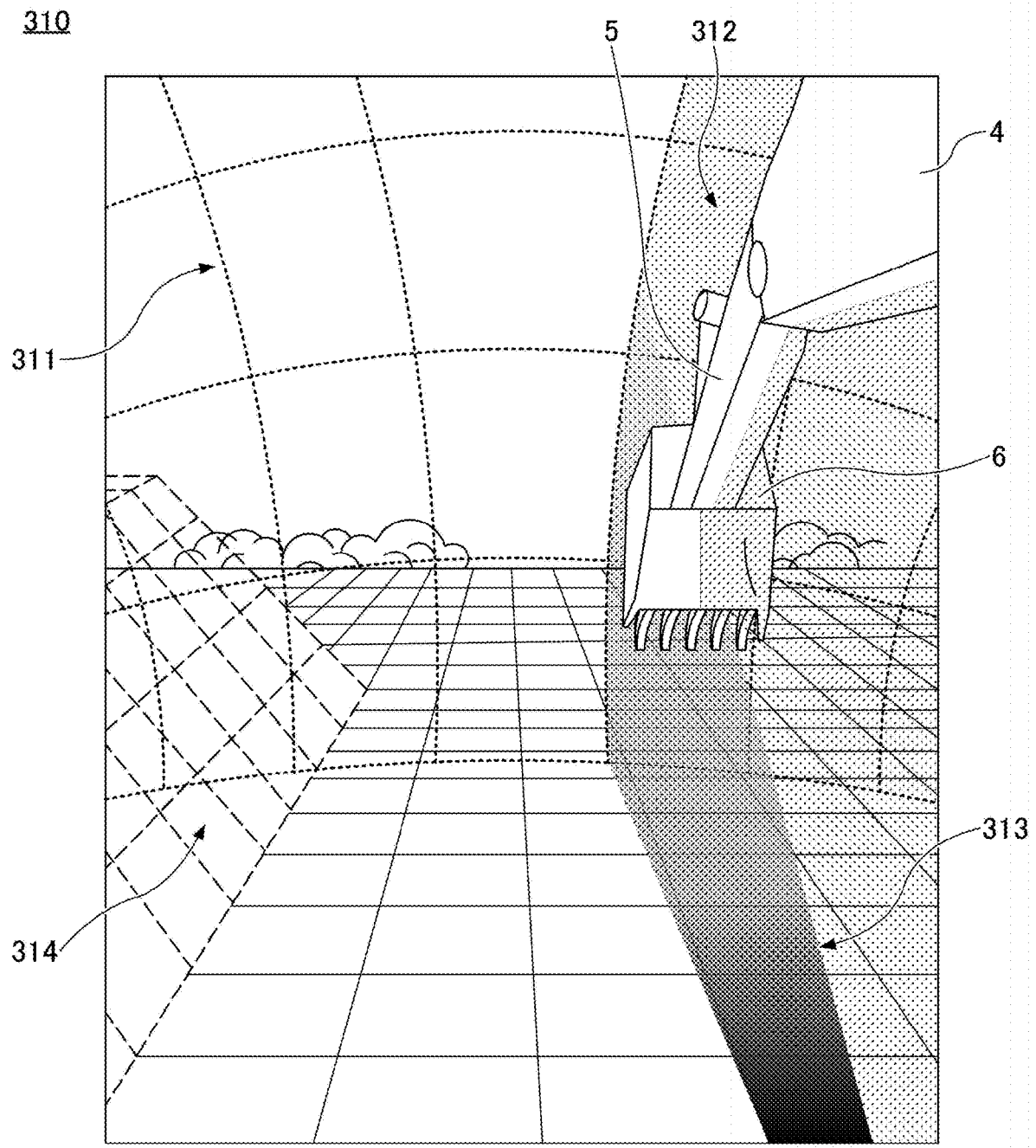
FIG. 3 is a diagram for explaining a first example of a visual field superimposed display function.

FIG. 3 is a diagram illustrating a first example of the visual field superimposed display function. More particularly, FIG. 3 is a diagram illustrating the first example of a front visual field (front visual field 310) viewed from the operator inside the cabin 10 through the front windshield.

As illustrated in FIG. 3, the front visual field 310 of the operator includes the work area in front of the slewing upper structure 3, and the attachments (the boom 4, the arm 5, and the bucket 6) in the upper right. In addition, the display device 50 displays (projects) information images 311 through 314 within the front visual field 310 of the operator (specifically, the front windshield as the projection surface of the cabin 10).

Information images corresponding to the information images 311 and 314 may be displayed (projected) in the left visual field of the operator (that is, the left side glass of the cabin 10). In addition, the information images 311 through 314 may be switchable between display and non-display, according to predetermined operations with respect to the input device 52. In other words, the information images 311 through 314 may be selectively displayed according to the predetermined input received by the input device 52.

The information image 311 displays a three-dimensional range reachable by the tip end of the attachment, more particularly, the work portion, such as the toe, the back side, or the like of the bucket 6, from a current position of the shovel 100, that is, a three-dimensional range in which the attachment is operable (hereinafter referred to as a "workable range"), by taking into consideration the slewing operation of the slewing upper structure 3.

For example, when the operator causes the shovel 100 to perform a sweep work to push sand, earth, or the like toward the front by the back surface of the bucket, manually or by utilizing the machine control function, the bucket may not be able to reach the sand, earth, or the like to be pushed farther away. In this case, the work efficiency may deteriorate because the operator cannot perform the work according to a plan assumed before starting the work.

In contrast, by displaying the workable range in a superimposed manner in the front visual field 310 of the operator, the operator can intuitively perceive an extent of the range in which the sweep work can be performed from the current position of the shovel 100, before starting the work. Accordingly, the work efficiency of the shovel 100 can be improved.

The information image 312 displays an operating plane of the attachment (the boom 4, the arm 5, and the bucket 6), three dimensionally. Hence, the operator can intuitively perceive the workable range of the attachment in the work area of the ambient environment of the boarding machine, in a state where the shovel 100 is located at the current position and the slewing upper structure 3 is oriented at a current slew angle.

The information image 313 displays an area having a relatively high work efficiency (that is, an area in which a relatively high excavation power is easily output) (hereinafter referred to as a "high efficiency area") for a predetermined work (for example, an excavation work) in the operating plane of the attachment, three dimensionally. The work efficiency is relatively high if the work efficiency is greater than a predetermined efficiency. Hence, the operator can intuitively perceive the attitude state of the attachment having a high work efficiency. Accordingly, the operator can be urged to perform a work having a higher work efficiency, to thereby improve the work efficiency of the shovel 100.

Further, the information image 313 displays high and low levels of a relative work efficiency in the high efficiency area using gradation. This example employs a gradation which changes from "black" indicating a relatively low work efficiency, to "white" indicating relatively high work efficiency. Hence, the operator can intuitively perceive the high and low levels of the work efficiency in the high efficiency area. Accordingly, the operator can be urged to perform a work having a higher work efficiency, to thereby further improve the work efficiency of the shovel 100.

The display device 50 may display (project) a numerical value of the work efficiency (for example, a numerical value of the work efficiency corresponding to the current attitude of the attachment) on the front windshield, under the control of the controller 30 and the computation device 30E, in place of or in addition to the information image 313. In addition, the display device 50 may display (project) an area having a relatively high work efficiency on the front windshield in conformity with a terrain of the work area in the ambient environment (in front) of the shovel 100 viewed from the operator inside the cabin 10, under the control of the controller 30 and the computation device 30E.

The information image 314 displays the target construction surface of the slope scheduled to be constructed (formed) by filling, three dimensionally. Hence, the operator can intuitively perceive the three-dimensional data corresponding to the slope shape after completion, while comparing the data with the current topographical shape. Accordingly, the operator can efficiently proceed with a filling work, a rolling work after the filling, or the like, while viewing the three-dimensional data of the target construction surface, by checking the progress from a difference between the current topographical shape and the three-dimensional data. The data related to the target construction surface may be input to the controller 30 by the operation of the operator operation via the input device 52, or may be input from a predetermined external device (for example, the management device 200 configured to manage the operation, construction information, or the like of the shovel 100) via the communication device 60. Hereinafter, the same applies to FIG. 4 (information images 411 through 414) which will be described later.

The information image 314 may be three-dimensional data of a target construction surface that is constructed (formed) by excavation or cutting (for example, refer to FIG. 4 which will be described later).

As described above, in this example, the display device 50 can display a work target (the information image 314 corresponding to the target construction surface), the workable range, or the like simultaneously, or selectively only in part, according to the actual topographical shape of the work area of the ambient environment of the boarding machine corresponding to the current progress of the work. Hence, the operator can intuitively perceive the information related to the work, and efficiently proceed with the work using the shovel 100.

<Second Example of Visual Field Superimposed Display Function>

Figure 4:
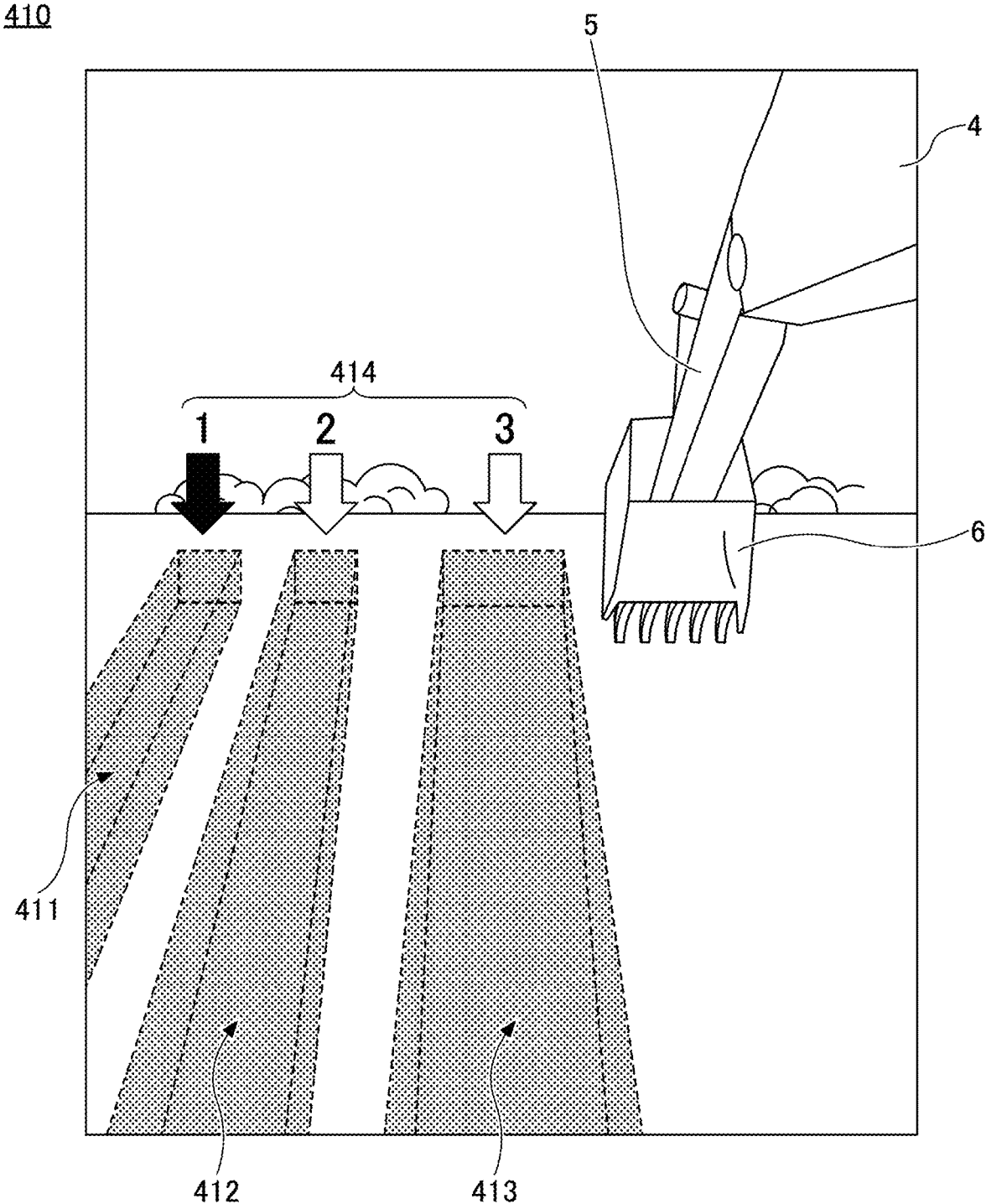
FIG. 4 is a diagram for explaining a second example of the visual field superimposed display function.

FIG. 4 is a diagram for explaining a second example of the visual field superimposed display function. More particularly, FIG. 4 illustrates the second example of the front visual field (front visual field 410) viewed from the operator inside the cabin 10 through the front windshield.

As illustrated in FIG. 4, the front visual field 410 of the operator includes the working area in front of the slewing upper structure 3, similar to FIG. 3, and also includes the attachments (the boom 4, the arm 5, and the bucket 6) in the upper right. In addition, the display device 50 displays (projects) information images 411 through 414 within the front visual field 410 of the operator (specifically, the front windshield as the projection surface of the cabin 10).

The information images corresponding to the information images 411 through 414 may be displayed (projected) in the left visual field of the operator (that is, the left side glass of the cabin 10).

Similar to FIG. 3, the display device 50 may display (project) the information images 411 through 414 in the front visual field 410 of the operator.

The information images 411 through 413 illustrate, three-dimensionally, target construction surfaces corresponding to three grooves to be constructed in the work area in front of the shovel 100 (slewing upper structure 3), respectively. Hence, the operator can intuitively perceive the three-dimensional data corresponding to the shape of the grooves after completion, while comparing the three-dimensional data with the current topographical shape. Accordingly, the operator can efficiently proceed with the excavation work while viewing the three-dimensional shape of the target construction surface, by checking the progress from the difference between the current topographical shape and the three-dimensional data.

The information image 414 displays information related to the construction order of the three grooves corresponding to the information images 411 through 413, that is, a construction plan. In other words, the information image 414 displays the plans of the plurality of scheduled excavation work. In this example, the plan indicates that the groove corresponding to the information image 411 is constructed first, the groove corresponding to the information image 412 is constructed second, and the groove corresponding to the information image 413 is constructed third. Hence, the operator can successively proceed with the plurality of work in an efficient manner according to a prescribed plan.

The display device 50 may display (project) information image related to the plans of a plurality of different types of work (for example, excavation work, filling work, burying work, backfilling work, or the like) on the front windshield.

Accordingly, in this example, the display device 50 displays the work plan (the information image 414) or the like including targets related to a plurality of scheduled work (the information images 411 through 413 corresponding to the target construction surface), and a plurality of construction targets (the three grooves corresponding to the information images 411 through 413) according to the actual topographical shape of the work area in the ambient environment of the boarding machine. For this reason, the operator can intuitively perceive the information related to the plurality of scheduled work, and efficiently proceed with the work using the shovel 100.

<Other Examples of Visual Field Superimposed Display Function>

The display device 50 may display an information image different from those of FIG. 3 and FIG. 4, in a superimposed manner, in the front visual field of the operator.

The display device 50 displays an information image related to control limits of the attachments related to the machine control function of the shovel 100 (boarding machine), in a superimposed manner in the field of view of the ambient environment of the shovel 100 (boarding machine) viewed from the operator, for example. The attachments, which also form a link mechanism formed by the boom 4, the arm 5, and the bucket 6, have different limits of operating speeds depending on attitude states thereof. More particularly, when the operator performs an operation only related to the arm 5 via the operating device 26, to operate the toe of the bucket 6 according to a certain locus, the limits of the speeds of the boom 4 and the bucket 6 which can follow the speed of the arm 5 operated by the operator are determined by the speed of the arm 5, mechanical characteristics of the shovel 100, the attitude state of the shovel 100, the shape of the target construction surface, or the like. For example, the display device 50 may display an area in which the speed limit of the (for example, the boom 4) is relatively high, on the three-dimensional data (the information image 312) corresponding to an operating surface of the attachment in the front visual field 310 of FIG. 3. The display device 50 may also display a gradation map indicating the high and low levels of speed limit of the link on three-dimensional data (the information image 312) corresponding to the operating surface of the attachment in the front visual field 310 of FIG. 3, for example. Hence, when the manual operation of the operator is assisted by the machine control function, the operator can perform the work by moving the shovel 100 to a position where the control limit of the machine control function is unlikely to be applied, for example. Accordingly, the work efficiency of the shovel 100 can be improved.

In addition, the display device 50 displays information related to the machine guidance function, that is, the work information described above, in a superimposed manner in the field of view of the ambient environment of the shovel 100 (boarding machine) viewed from the operator, for example. In this case, the display device 50 may display the work information in alignment to the position of the bucket 6 in the front visual field viewed from the operator. Hence, the operator can intuitively perceive the work information corresponding to the machine guidance function (for example, the distance between the target construction surface and the work portion of the bucket 6, or the like), and efficiently proceed with the work. Accordingly, the work efficiency of the shovel 100 can be improved.

Moreover, the display device 50 displays various work paths (for example, an excavation direction of the excavation work, a moving path when proceeding with the work while moving little by little in a relatively large work area, or the like) in a superimposed manner in the field of view of the ambient environment of the shovel 100 (boarding machine) viewed from the operator, for example. For example, the display device 50 may display an information image (for example, an arrow, or the like) indicating the excavation direction in accordance with each of the target construction surfaces of the three grooves (the information images 411 through 413) in the front visual field 410 of FIG. 4. Hence, the operator can intuitively perceive a prescribed work path, and efficiently proceed with the work along the path. Accordingly, the work efficiency of the shovel 100 can be improved.

Further, the display device 50 displays an information image guiding the operation of the operator related to the attachment in a superimposed manner in the field of view of the ambient environment of the shovel 100 (boarding machine) viewed from the operator, for example. For example, the display device 50 may display a virtual attachment image (hereinafter referred to as an "attachment image") in the front visual field 410 of FIG. 4, and cause the attachment image to dynamically perform a relatively efficient operation (that is, a recommended operation) along the operating surface of the attachment. Hence, the operator can intuitively perceive the appropriate operation of the attachment when performing a predetermined operation (for example, the excavation work). For this reason, the operator can efficiently proceed with the work in a manner simulating the recommended operation which is displayed. In other words, shovel 100 (controller 30) can guide the operator to perform a more efficient operation. Accordingly, the work efficiency of the shovel 100 can be improved.

[Actions]

Next, actions of the shovel 100 (display device 50) according to this embodiment will be described.

In this embodiment, the display device 50 displays the information image related to the excavation work in the image of the work area in the ambient environment viewed from the shovel 100 (cabin 10), or in the field of view of the user (operator) viewing the work area from the shovel 100 (cabin 10).

Accordingly, the user can observe the information image together with the state of the work area. For this reason, the user can more intuitively perceive the content of the information image together with the state of the work area. Accordingly, the user can proceed with the excavation work using the shovel 100 more efficiently.

The display device 50 may display an information image related to a work other than excavation work (for example, the burying work, the rolling work, the leveling work, or the like).

Further, in this embodiment, the display device 50 may display an area in which the work efficiency of the excavation work is relatively high, in the image of the ambient environment or the field of view of the user, in the view of the work area viewed from the shovel 100.

Hence, the user can more intuitively perceive the area where the work efficiency of the excavation work is relatively high. Accordingly, the user can proceed with the excavation work using the shovel 100 more efficiently.

In addition, in this embodiment, the display device 50 may display the information image related to the plan of the excavation work including the plurality of scheduled construction targets, in the image of the ambient environment or in the field of view of the user, in the view of the work area viewed from the shovel 100.

Hence, the user can more intuitively perceive the plan of the excavation work including the plurality of construction targets of the shovel 100. Accordingly, the user can proceed even more efficiently with the excavation work according to the predetermined plan using the shovel 100, even when the plurality of construction targets are present.

Further, in this embodiment, the display device 50 may display the information image related to the control limit related to the machine control function of the shovel 100, in the image of the ambient environment or in the field of view of the user, in the view of the work area viewed from the shovel 100.

Hence, the user to more intuitively perceive the control limit related to the machine control function of the shovel 100. Accordingly, when utilizing the machine control function to proceed with the excavation work, the user can move the shovel 100 to a location where the control limit of the attachment is unlikely to be applied, or to operate the attachment by taking into consideration the control limit of the attachment. The user can thus proceed with the excavation work using the shovel 100 more efficiently.

In addition, in this embodiment, the display device 50 may display the information image indicating the range reachable by the tip end of the attachment, in the image of the ambient environment or in the field of view of the user, in the view of the work area viewed from the shovel 100.

Hence, the user can more intuitively perceive the range reachable by the tip end of the attachment. Accordingly, the user can preset the position of the shovel 100 so that the tip end of the attachment can reach into a target area of the excavation work. Accordingly, the user can proceed with the excavation work using the shovel 100 more efficiently.

Moreover, in this embodiment, the display device 50 may display the information image which guides the operation of the attachment, in the image of the ambient environment or in the field of view of the user, in the view of the work area viewed from the shovel 100.

Hence, the user to more intuitively understand the information image which guides the operation of the attachment. Accordingly, the user can easily operate the attachment according to the content of the information image. The user can thus proceed with the excavation work using the shovel 100 more efficiently.

[Variation/Modification]

Although the embodiments are described above in detail, the present disclosure is not limited to the specific embodiments, and various variations and modifications may be made within the scope of the appended claims.

For example, in the embodiments described above, the visual field superimposed display function for the user (the operator inside the cabin 10, or the like) of the shovel 100 using the display device 50 is described, however, a similar function may be provided for a user of the management device which remotely operates the shovel 100. More particularly, the remote control display device 230A of the management device 200 may directly display an information image related to a predetermined operation of the shovel 100, in the image of the ambient environment by applying the AR technique, similar to the display device 50 of the shovel 100, under the control of the control device 210. Accordingly, the user who remotely operates the shovel 100 can observe the information image together with the state of the work area, thereby enabling the user to intuitively perceive the content of the information image together with the state of the work area.

Moreover, in the embodiments and the variations described above, the visual field superimposed display function for the operator, operating the shovel 100 via the operating device 26, or remotely operating the shovel 100, is described, however, a similar functions may be provided for a user other than the operator of the shovel 100. In this case, the display device applied with the visual field superimposed display function may be utilized separately and independently of the device (the operating device 26, the remote control device 240A, or the like) which operates the shovel 100. In other words, the display device applied with the visual field superimposed display function may be utilized in combination with a device which operates the shovel 100, or may be utilized separately and independently of the device which operates of the shovel 100.

For example, the visual field superimposed display function may be applied to a display device (hereinafter referred to as a "checking display device") configured to check the operation state of the shovel 100 from a viewpoint of the manager, the supervisor, or the like at the work site of the shovel 100, from the shovel 100 (cabin 10). In this case, the shovel 100 may be operated by the operation of the operator, or operated by the machine control function regardless of the operator's operation by a fully automatic operation. The checking display device may be a fixed display device, or a portable display device (for example, a smartphone, a tablet terminal, a wearable display terminal, or the like), similar to the display device 50. More particularly, the checking display device may directly display the information image related to the predetermined operation of the shovel 100, in the image of the ambient environment during the work in progress, similar to the remote control display device of the management device 200. Accordingly, the manager, the supervisor, or the like at the work site can check the operation state of the shovel 100 against the construction target or the like received from outside the shovel 100, for example. For this reason, in a state where the shovel 100 is performing the fully automatic operation and a problem occurs in the operation state of the shovel 100, the manager or the supervisor may stop the work of the shovel 100, or review the plan of the work of the shovel 100, for example.

For example, the visual field superimposed display function may be applied to a display device (hereinafter referred to as an "experience-providing display device") configured to enable a general user (hereinafter referred to as a "general user"), not normally associated with the shovel 100, to experience the operation state of the shovel 100 from outside the work site of the shovel 100. The experience-providing display device may be a fixed display device, or a portable display terminal (for example, a smartphone, a tablet terminal, a wearable display terminal, or the like), similar to the display device 50. More particularly, the experience-providing display device may directly display the information image related to the predetermined operation of the shovel 100, in the image of the ambient environment during the work in progress, similar to the remote control display device of the management device 200. Accordingly, the general user can experience observing the construction target (for example, the three-dimensional data of the target construction surface, or the like) which is displayed as the information image, and the actual working state of the shovel 100 toward completion of the construction target.

Further, in the embodiments and the variations described above, the shovel 100 is configured to hydraulically drive the various driven elements such as the undercarriage 1, the slewing upper structure 3, the boom 4, the arm 5, the bucket 6, or the like. However, a portion of the various driven elements of the shovel 100 may be driven electrically. In other words, the configuration or the like disclosed in the embodiments described above may be applied to a hybrid shovel, an electric shovel, or the like.

According to the embodiments, variations, and modifications referred above, it is possible to provide a technique which enables the operator to more intuitively perceive the information when displaying the information image for assisting the work using the shovel.

Further, the present disclosure is not limited to the embodiments, but various variations and modifications may be made without departing from the scope of the present disclosure.

The invention claimed is:

1. A display system for a shovel having a slewing upper structure and an imaging device mounted on the slewing upper structure, the display system comprising:
   a display device configured to display an information image for assisting an excavation work of the shovel; and
   a controller configured to selectively display the information image selected from a plurality of information images on the display device in response to an input, wherein
   the controller controls the display device to display the selected information image in an ambient environment image in a view of a work area viewed from the shovel, or in a field of view of a user operating the shovel,
   the plurality of information images include a control limit related to a machine control function which performs the excavation work regardless of an operation performed by the user, and at least one of work information related to a machine guidance function which guides a manual operation of the shovel, and a plan of the excavation work,
   the control limit indicates a three-dimensional range reachable by a tip end of an attachment of the shovel, in a state visible by the user viewing an ambient environment of the shovel, and
   the plan of the excavation work includes an order and a type of work to be performed on each of a plurality of scheduled excavation targets.

2. The display system as claimed in claim 1, wherein the imaging device includes a plurality of sensors or cameras mounted on the slewing upper structure at positions to capture images in front, rear, left, and right of the slewing upper structure.

3. The display system as claimed in claim 2, wherein the controller controls the device to display an ambient environment image based on images captured by the plurality of sensors or cameras, and superimpose the selected information image on the displayed ambient environment image.

4. The display system as claimed in claim 3, wherein the ambient environment image includes the images captured by the plurality of sensors or cameras capturing images in front, rear, left, and right of the slewing upper structure.

5. The display system as claimed in claim 1, wherein the display device includes a wearable device configured to display the selected information image on a transmission type projection surface in the field of view of the user viewing the work area from the shovel.

6. The display system as claimed in claim 1, wherein the information image includes an information image of an operating plane of an attachment of the shovel displayed three-dimensionally and including areas having different levels of work efficiencies for the excavation work, and the different levels of the work efficiencies are indicated using gradation or numerical values.

7. The display system as claimed in claim 1, wherein the information image includes an information image which guides an operation of an attachment of the shovel.

8. The display system as claimed in claim 1, wherein the display device is configured to be portable by the user.

9. A shovel comprising:
a cabin; and
the display system according to claim 1,
wherein the display device is provided inside the cabin.

10. An information processing apparatus comprising:
the display system according to claim 1;
a communication device configured to communicate with the shovel; and
an operating device, operated by the user, and configured to remotely operate the shovel via the communication device.

11. The display system as claimed in claim 1, wherein the controller controls the display device to superimpose the selected information image on
an image of a work area imaged by the imaging device and displayed on a non-transmission type projection surface or display, or
the image of the work area visible on a transmission type projection surface or display in a field of view of a user operating the shovel.

12. A shovel comprising:
a cabin; and
the display system according to claim 11,
wherein the display device is provided inside the cabin.

13. An information processing apparatus comprising:
the display system according to claim 11;
a communication device configured to communicate with the shovel; and
an operating device, operated by the user, and configured to remotely operate the shovel via the communication device.

* * * * *